United States Patent [19]

Imamura et al.

[11] Patent Number: 5,134,698
[45] Date of Patent: Jul. 28, 1992

[54] DATA PROCESSING SYSTEM HAVING A STORAGE CONTROLLER FOR TRANSFERRING AN ARBITRARY AMOUNT OF DATA AT AN ARBITRARY ADDRESS BOUNDARY BETWEEN STORAGES

[75] Inventors: Jiro Imamura, Hiratsuka; Hiroyuki Okura, Hadano, both of Japan

[73] Assignees: Hitachi, Ltd.; Hitachi Microcomputer Engineering Ltd., both of Tokyo, Japan

[21] Appl. No.: 409,764

[22] Filed: Sep. 20, 1989

[30] Foreign Application Priority Data

Sep. 21, 1988 [JP] Japan .................. 63-238600

[51] Int. Cl.⁵ ........................................... G06F 13/00
[52] U.S. Cl. ........................... 395/425; 364/243.2;
  364/246.3; 364/246.7; 364/254.3; 364/260.1;
  364/DIG. 1
[58] Field of Search ... 364/200 MS File, 900 MS File;
  395/425

[56] References Cited

U.S. PATENT DOCUMENTS

| | | | |
|---|---|---|---|
| 3,936,804 | 2/1976 | Bachman | 364/200 |
| 4,296,465 | 10/1981 | Lemak | 364/200 |
| 4,344,130 | 8/1982 | Fung et al. | 364/200 |
| 4,713,748 | 12/1987 | Magar et al. | 364/200 |
| 4,821,172 | 4/1989 | Kaneko et al. | 364/200 |
| 4,860,245 | 8/1989 | Kinoshita | 364/900 |
| 4,891,754 | 1/1990 | Boreland | 364/200 |

Primary Examiner—Eddie P. Chan
Attorney, Agent, or Firm—Antonelli, Terry Stout & Kraus

[57] ABSTRACT

A data processing system which encludes an instruction processor, a storage controller, a main storage, and an extended storage. The storage controller contains a data transfer unit for transferring data between the main storage and the extended storage by an instruction from the instruction process specifying an amount of the data to be transferred. The data transfer unit is provided in the storage controller and with a data buffer and an address addition-subtraction circuit for operating a source address and a destination address. The data is transferred between the main storage and the extended storage by sending to a firmware of a storage control a main storage real address translated from a main storage virtual address specified by the instruction, the number of data to be transferred from the main storage, an extended storage real address, and the number of bytes to be transferred from the extended storage, in a manner so as to match with a unit of data to be processed on the extended storage.

5 Claims, 3 Drawing Sheets

DATA PROCESSING SYSTEM HAVING A STORAGE CONTROLLER FOR TRANSFERRING AN ARBITRARY AMOUNT OF DATA AT AN ARBITRARY ADDRESS BOUNDARY BETWEEN STORAGES

BACKGROUND OF THE INVENTION

The present invention relates to a data processing system and, more particularly, to a data processing system which has a storage configuration containing a main storage and an extended storage.

Conventional data processing systems with a storage configuration containing an extended storage in addition to a main storage is constructed by a system comprising an instruction processor (IP), a storage controller (SC), an input-output processor (IOP), a main storage (MS) and an extended storage (ES). The extended storage of the storage configuration in these data processing systems is positioned functionally in the same category as an external storage and considered as a device to carry out paging processes.

For instance, a data processing system with the extended storage of this type is disclosed in U.S. Pat. No. 4,476,524 corresponding to Japanese Patent Publication (laid-open) No. 9,276/1983. This data processing system is provided with a page transfer bus that is an independent data path between the extended storage (page storage) and the main storage and with a data transfer means. This system can realize a system configuration to transfer data between the extended storage and the main storage on the page transfer bus.

In data transfers between the main storage and the extended storage by a transfer instruction for transferring data, restrictions are placed on a unit of data to be transferred requiring that the minimum unit of data to be transferred be one page (4 KB (kilobytes)) and on a main storage address directed by the transfer instruction requiring that the address should be on the boundary of the page.

When the extended storage is intended to be used for purposes other than for the paging process in the data processing system with the extended storage, these restrictions on the minimum unit of transfer data of one page to be transferred between the main storage and the extended storage by the transfer instruction and on the location of the main storage address of an operand of the transfer instruction being on the boundary of the page present the following problems:

(1) In transferring data in an arbitrary amount of data to be transferred between the main storage and the extended storage, processing for transferring data can be executed between a data region and a work region on the main storage, for example, by a MOVE instruction. At this end, it is possible to provide the extended storage with the data region and the main storage with the work region to permit the data transfer between the extended storage and the main storage by means of a transfer instruction processing by the MOVE instruction. In order to implement a new program containing the transfer instruction for this processing, however, the minimum unit of 4 KB for the data transfer between the main storage and the extended storage by the transfer instruction suffers the disadvantage that a capacity in the regions of the main storage and the extended storage required by the program is increased.

(2) In modifying a conventional existing program, the existing program is designed such that, in both the data region and the work region, a majority of their addresses are a 4-byte boundary or a 8-byte boundary requiring that the program be modified to a great extent. Such a great modification of the program, however, is practically impossible.

SUMMARY OF THE INVENTION

Therefore, the present invention has the object to provide a data processing system in which an extended storage can also be used for purposes other than the paging processing.

The present invention has another object to provide a data processing system in which a unit of data transfer between the main storage and the extended storage becomes so arbitrary that the restriction on addressing the main storage address in the transfer instruction between the main storage and the extended storage can be avoided.

In order to achieve the above-stated objects, the present invention provides a data processing system including an instruction processor, a storage controller, a main storage, and an extended storage, wherein the system further includes a data transfer unit for transferring data between the main storage and the extended storage by an instruction from the instruction processor for specifying an amount of the data to be transferred therebetween. This data transfer unit is provided in the storage controller and contains a data buffer and an address addition-substration circuit for operating a source address and a destination address.

The data transfer unit is to transfer data between the main storage and the extended storage by sending to a firmware of a storage control (a microprogram control) a main storage real address translated from a main storage virtual address specified by the transfer instruction in a manner so as to match with a unit of data processed by the extended storage, a number of data to be transferred from the main storage, an extended storage real address, and a number of data to be transferred from the extended storage.

Furthermore, when the data is transferred between the main storage and the extended storage with the data processing system containing the instruction processor, the storage controller, the main storage and the extended storage in which the storage controller is provided with the data transfer unit for the data transfer by the instruction specifying the amount of data to be transferred between the main storage and the extended storage, the data is transferred by setting a unit of data to be transferred between the main storage and the extended storage by one operation to a one page and dividing the data to be transferred from the main storage into page units based on the main storage virtual address specified by the transfer instruction for transferral between the main storage and the extended storage and on the amount of data to be transferred therebetween. When the page divided passes over the page boundary, on the one hand, the page is further divided into two blocks and top addresses of the two blocks are translated into main storage real addresses which are then sent to the storage controller together with the number of its bytes to be transferred as well as the extended storage real address and the number of bytes to be transferred from the extended storage, whereby the data is transferred in the manner as have been described hereinabove. When the page divided does not pass over the page boundary, on the other hand, one set of a main storage real address obtained by an address translation of a top address of the page divided is fed to the storage controller together with the number of its bytes to be transferred as well as the extended storage real address and the number of its bytes to be transferred, and the data of one page is transferred between the main storage and the extended storage on the basis of two sets of the main storage real address and the number of its bytes to be transferred as well as the extended storage real address and the number of its bytes transferred, which are fed to the storage controller. If the amount of data to be transferred, which is specified by the transfer instruction, is in the amount of plural pages, the data transfer is continued to thereby transfer the rest of the pages.

More specifically, the data is transferred between the main storage and the extended storage in a transfer data unit by one operation after dividing the data into page units, and the data is transferred from the main storage to the extended storage or from the extended storage to the main storage in the amount of a page as a unit of data transfer. In this case, a total data to be transferred from the main storage by dividing it into page units on the basis of the main storage virtual address specified by the transfer instruction from the main storage to the extended storage and the number of data to be transferred.

In other words, the data transfer from the main storage to the extended storage may be carried out in the following manner:

(1) When the page obtained by dividing the transfer data into page units passes over the page boundary, the page is further divided into two blocks to be transferred and a top virtual address of the forward block and a page boundary virtual address of the rearward block are translated into two real addresses which are then fed to the storage controller together with the numbers of their bytes to be transferred, as well as the extended storage real address and the number of bytes of 4 KB to be transferred. Then data of two transfer blocks are fetched from the main storage and then merged, and thereafter stored in the extended storage real address.

(2) When the page obtained by dividing the transfer data in a page unit does not pass over the page boundary, a block of the page to be transferred is one and a top virtual address of the block is translated into one main storage real address. The main storage real address and the number of its bytes to be transferred are then sent to the storage controller together with the extended storage real address and the number of its bytes to be transferred, thereby fetching the data of the transfer block from the main storage and storing it in the extended storage real address.

When the data to be transferred which is specified by the transfer instruction is in the amount of plural pages, the processing is executed by combining the procedure (1) with the procedure (2) as described above.

The data is transferred from the extended storage to the main storage in the same manner as have been described hereinabove from the main storage to the extended storage by dividing the data to be transferred into page units by the main storage virtual address and the amount of data to be transferred.

In other words, the data transfer from the extended storage to the main storage may be broken down into the following categories:

(3) When the page passes over the page boundary by dividing the transfer data into page units, like the processing in the procedure (1) above, the transfer data is further divided into two transfer blocks and two sets of their main storage real addresses and the numbers of their bytes to be transferred are sent to the storage controller together with an extended storage address and the number of bytes to be transferred, thereby fetching data from the extended storage and dividing each of the data into transfer blocks which are then stored by the number of bytes to be transferred in accordance with the corresponding two main storage real addresses.

(4) When the page obtained by dividing the data to be transferred in a page unit does not pass over the page boundary, the main storage real address and the number of bytes to be transferred as well as the extended storage real address and the number of bytes to be transferred are sent to the storage controllr, thereby fetching the transfer data by the number of bytes to be transferred from the extended storage and storing it in accordance with the main storage real address, in the same manner as in the procedure (2) above when the page does not pass over the boundary.

When the data to be transferred, which is specified by the transfer instruction is in the amount of plural pages, the processing is executed by combining the procedure (3) with the procedure (4) above.

As have been described hereinbefore, the data processing system containing the instruction processor, storage controller, main storage and extended storage permits the data transfer between the main storage and the extended storage by the instruction from the instruction processor for transferring the amount of data. Thus, the data processing system according to the present invention allows the data to be transferred in an arbitrary amount of data to be transferred between the main storage and the extended storage.

This arrangement enables a data unit transferred between the main storage and the extended storage by the transfer instruction to be set in anarbitrary amount and removes the restrictions on addressing the main storage address, thereby allowing the storage controller to be used for purposes other than the paging processing.

BRIEF DESCRIPTION OF THE DRAWINGS

Other objects, features and advantages of the present invention will become apparent in the course of the detailed description of the preferred embodiments which follows with reference to the accompanying drawings in which.

DESCRIPTION OF THE PREFERRED EMBODIMENT

Figure 1:
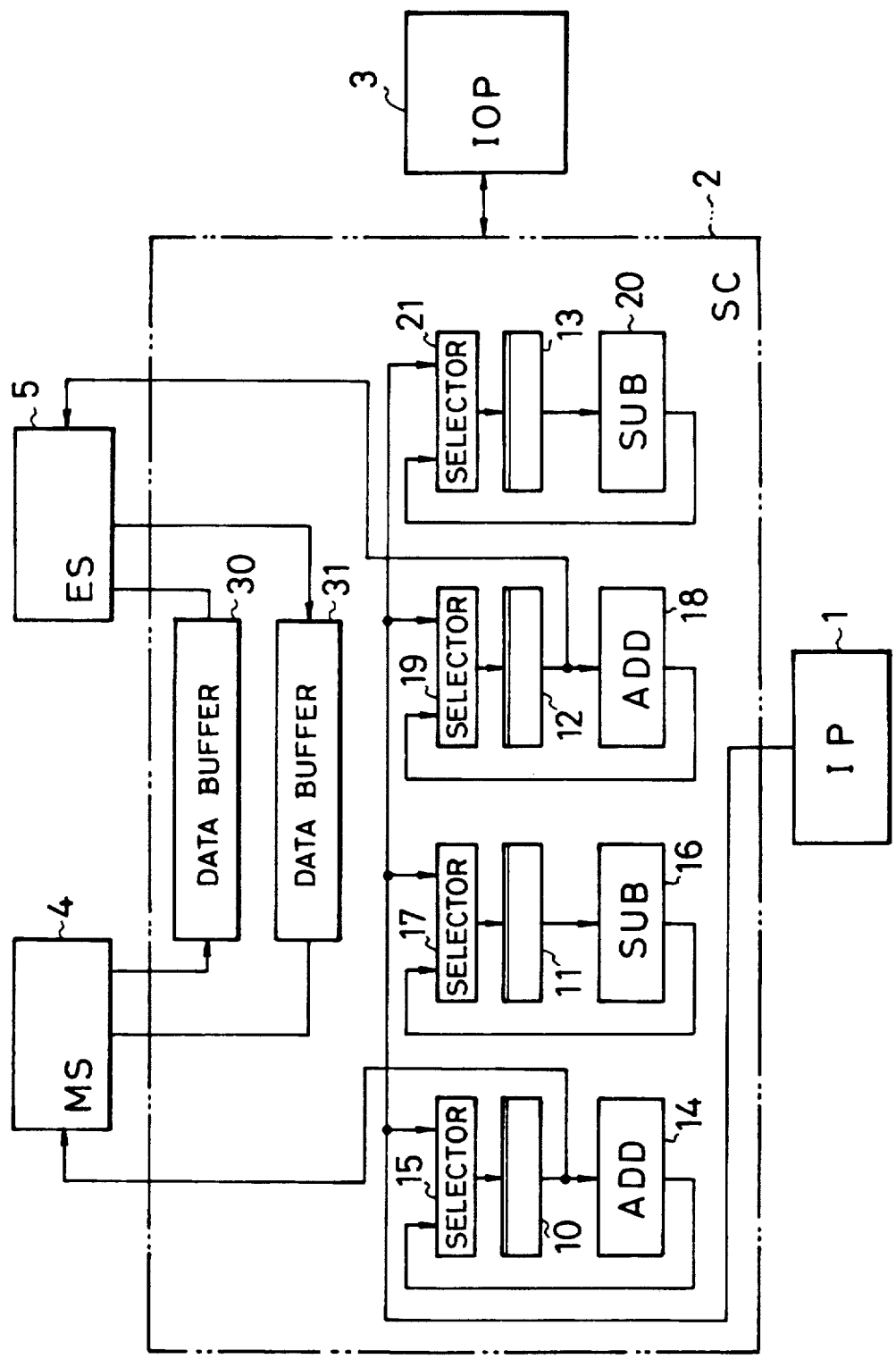
FIG. 1 is a block diagram showing an essential structure of the data processing system according to one example of the present invention.

The data processing system according to the present invention will be described with reference to FIG. 1 illustrating a block diagram of the essential structure of one example according to the present invention. The data processing system comprises an instruction processor (IP) 1, a storage controller (SC) 2, an input-output processor (IOP) 3, a main storage (MS) 4, and an extended storage (ES) 5. In order to allow a data transfer between a main storage 4 and the extended storage 5 by the transfer instruction, the storage controller 2 contains, as a data transfer unit, registers 10, 11, 12 and 13 for holding an address, a number of data to be transferred and so on to be used for a data transfer control, addition-subtraction circuits 14, 16, 18 and 20, selectors 15, 17, 19 and 21, as well as data buffers 30 and 31, on top of a configuration of a firmware for a storage control (a microprogram control).

In the data processing system, data is transferred between the main storage 4 and the extended storage 5 by a transfer instruction from the instruction processor 1 specifying an amount of data to be transferred. Thus the transfer instruction for transferring data from the main storage 4 to the extended storage 5 specifies a main storage virtual address, an extended storage real address, and an amount of data to be transferred.

Figure 2:
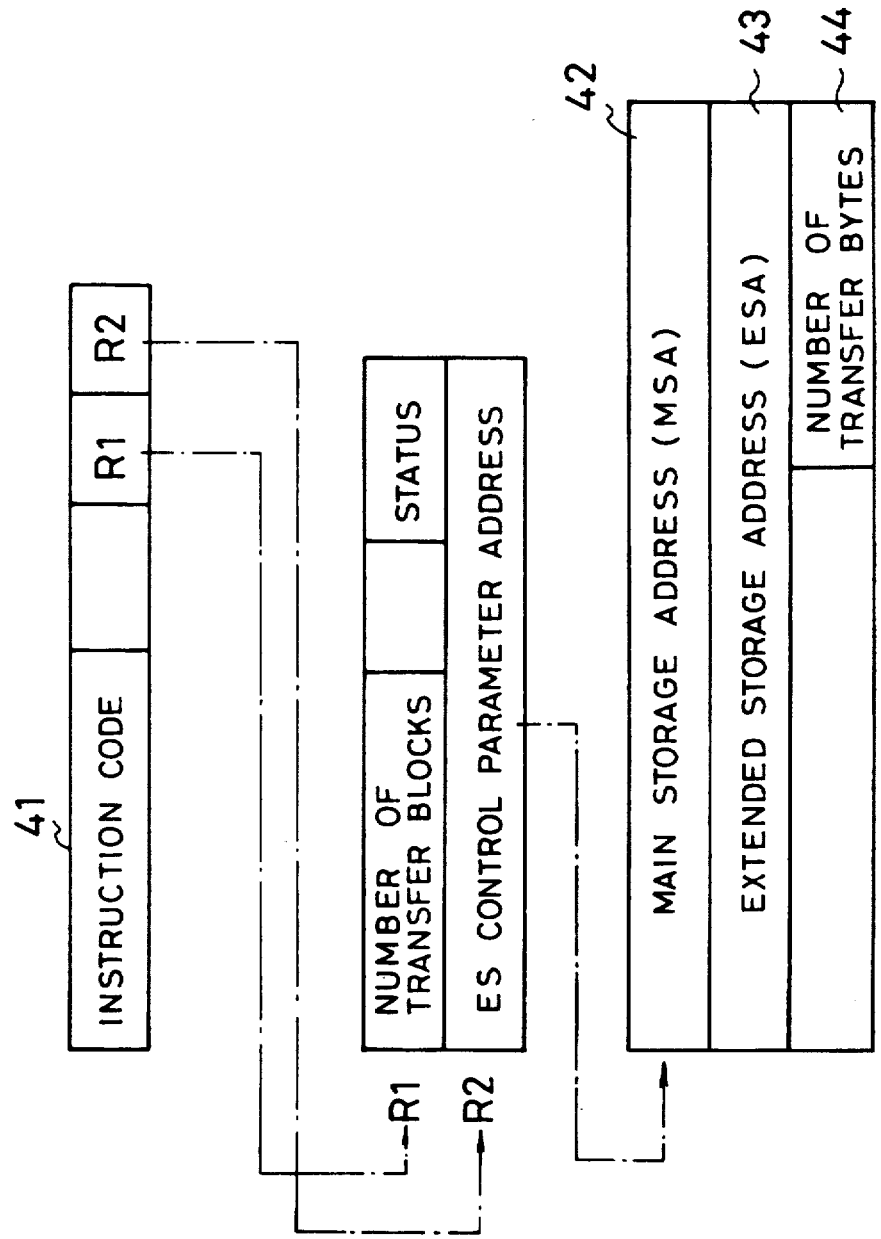
FIG. 2 illustrates one example of transfer instructions for transferring data between the main storage and the extended storage.

FIG. 2 illustrates one example of a format of a transfer instruction for transferring data between the main storage 4 and the extended storage 5. As shown in FIG. 2, the transfer instruction for transferring the data between the main storage and the extended storage comprises an instruction code 41 indicating whether a data transfer from the main storage to the extended storage or a data transfer from the extended storage to the main storage is to be effected, a main storage address 42, an extended storage address 43, and the number 44 of bytes transferred specifying an amount of data to be transferred.

Figure 3:
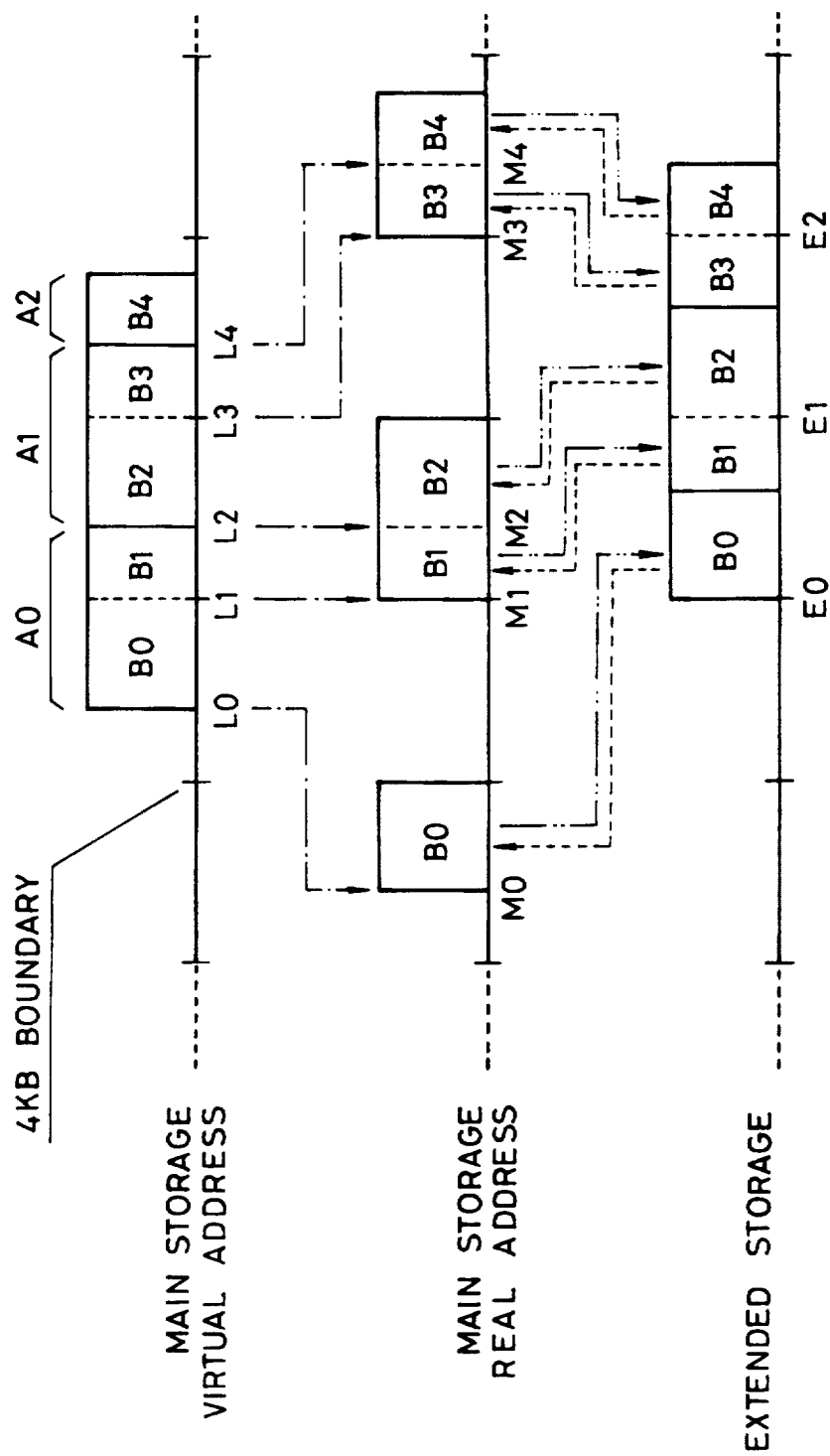
FIG. 3 illustrates an address map for explaining the relationship among the main storage virtual address, the main storage real address and the extended storage address of data to be transferred between the main storage and extended storage.

FIG. 3 illustrates an address map for explaining the relationship among the main storage virtual address, the main storage real address and the extended storage address of data transferred between the main storage and the extended storage.

Operation of the data processing system of FIG. 1 will be described with reference to FIG. 3 by way of examples in which the processing of the transfer instruction is executed for transferring data from the main storage to the extended storage. In transferring the data between the main storage and the extended storage, the data to be transferred is fetched by one operation for the extended storage 5 and a data unit to be stored is one page (4 KB). The data fetched from the main storage 4 and transferred to the extended storage 5 is represented by reference symbol A in FIG. 3.

The data A is divided into pages, for example, 3 pages, A0, A1, and A2. The pages A0 and A1 are both in the amount of 4 KB while the page A2 does not amount to 4 KB. The page A0 is further divided into two blocks, block B0 and block B1, by page boundary L1 per 4 KB of the main storage virtual address. Likewise, the page A1 is divided into two blocks, block B2 and block B3, by page boundary L3 per 4 KB. The page A2, however, cannot be divided because it does not reach the page boundary in every 4 KB and corresponding block in a unit of data transfer is block B4 only.

In transferring data A from the main storage 4 to the extended storage 5, the main storage virtual address L0 of block B0 of data A and the main storage virtual address L1 of block B1 on the page boundary are translated into two main storage real addresses, i.e., main storage real address M0 and main storage real address M1, respectively, by a microprogram control of the instruction processor 1.

In order to fetch block B0 from the main storage 4 and store it into the extended storage 5, the main storage real address M0, the number of main storage transfer bytes, the extended storage real address, and the number of extended storage transfer bytes are set respectively to the registers 10, 11, 12, and 13 of the storage controller 2, respectively. In the register 13 is set the number of data of 4 KB corresponding to a transfer unit of one page. In the storage controller 2, data to be transferred by the number of main storage transfer bytes set in the register 11 is fetched from the main storage real address M0 set in the register 10 and set in the data buffer 30.

In other words, when output of the register 10 is inputted into the addition circuit 14 for the address addition and a read request for reading data to be transferred to the main storage 4 is issued, a read address is added to generate a next transfer data read request and the renewed next address is set again in the register 10 through the selector 15. When output of the register 11 is inputted in a subtraction circuit 16 for subtracting the number of bytes to be transferred one by one and a data read request to the main storage 4 is issued, the number of bytes transferred is subtracted from the number of transfer bytes set in the register 11 and renewed number of transfer bytes is set against through the selector 17 in the register 11 in order to generate a next data read request.

When the number of transfer bytes set in the register 11 amounts to zero, the issuance of the data read request to the main storage 4 is suspended. The data fetched from the main storage 4 is set in the data buffer 30 and then the data of the data buffer 30 is written in in the extended storage 5.

Then the main storage real address M1 and the number of bytes of block B1 transferred are set in the registers 10 and 11, respectively. Like the processing in block B0, the data to be transferred is fetched from the main storage 4 and the fetched data is set in the data buffer 30.

The data set in the data buffer 30 is stored in the extended storage 5 in accordance with the extended storage real address set in the register 12, by managing an amount of data transferred by the number of extended storage transfer data set in the register 13. Output of the register 12 is connected to the addition circuit 18 for the address addition, and output of the register 13 is connected to the subtraction circuit 20 for subtracting the number of bytes transferred. The processing of storing into the extended storage 5 is executed, after the issuance of a store request, by adding the address and subtracting the number of bytes transferred, and the renewed address and number of transfer bytes are set respectively in the original registers 12 and 13 through the selectors 19 and 20. The processing for storing the data from the data buffer 30 into the extended storage 5 is initiated by a microprogram control of the storage control immediately when the data is set in the data buffer 30. As the number of bytes transferred of the register 13 reaches zero, the issuance of a store request to the extended storage 5 is suspended.

In transferring the data of block B2 and block B3 dividing the page A1, the data to be transferred is fetched from the main storage 4 and stored into the extended storage 5 through the data buffer 30 in the same manner as in the data transfer of block B0 and block B1 as have been described hereinbefore.

When data of block B4 is transferred, a main storage virtual address L4 is subjected to address translation yielding a main storage real address M4. The main storage actual address M4, the number of bytes of the data of block B4 to be transferred, and the extended storage real address E2 are sent to the storage controller 2, and data for controlling the data transfer are set in the registers 10, 11, 12 and 13. The main storage real address M4 is set in the register 10, and the extended storage actual address E2 is set in the register 12. The number of bytes transferred is set in the respective registers 11 and 13. The number of bytes transferred is smaller than a value of 4 KB. The data of block B4 is fetched from the main storage 4 and stored in the extended storage 5 in the same manner of the data transfer as have been described hereinbefore. The amount of the data transferred is smaller than 4 KB.

As have been described hereinbefore, the data transfer from the main storage 4 to the extended storage 5 is conducted by the microprogram control of the storage control by the instruction from the instruction processor by the number of transfer bytes specified by the transfer instruction.

The instruction for transferring data from the extended storage 5 to the main storage 4 may be processed in the manner as will be described hereinafter.

In the transfer instruction for data transfers from the extended storage 5 to the main storage 4, data to be transferred is processed by paging, division of a page into blocks, and address translation, in the same manner as in the transfer instruction for transferring data from the main storage 4 to the extended storage 5. The instruction processor 1 transfers to the storage controller 2 a main storage real address, the number of main storage transfer bytes, an extended storage real address, and the number of extended storage transfer bytes which are set respectively into the registers 10, 11, 12, and 13, in the same manner as have been described hereinabove.

In FIG. 3, a direction of blocks of the data to be transferred from the extended storage 5 to the main storage 4 is indicated by the dashed line with arrow. As shown in FIG. 3, blocks B0 and B1 of the page A0 stored in one page of extended storage real addresses (E0-E1) of the extended storage 5 are continuously fetched from the extended storage 5 by 4 KB and set into the data buffer 31. When the data is stored from the data buffer 31 to the main storage 4, it is divided into two blocks (blocks B0 and B1) which in turn are stored respectively into the main storage real addresses M0 and M1.

Data of the page A1 is transferred by setting the data of one page to be transferred into the data buffer 31 and then dividing it into blocks, i.e., blocks B2 and B3, in the same manner as in the transfer of data divided into blocks B0 and B1. The data transfer of block B4 of the page A2 is carried out by setting in the data buffer 31 data of less than 4 KB fetched from the extended storage 5 and storing it in the main storage 4 as it is.

Although the present invention has been shown and described by way of the embodiment, it should be understood that the present invention should be interpreted to be not restricted to the embodiment and to encompass various changes and modifications without departing the spirit and scope of the invention.

In accordance with the present invention, the data processing system is provided with the data transfer unit which enables data transfers between the main storage and the extended storage by a transfer instruction specifying an amount of data to be transferred therebetween, thereby making the amount of data for a data transfer arbitrary without avoiding restrictions on the addressing of a main storage virtual address specified by the instruction.

It is also to be noted that an amount of data to be transferred by an instruction for executing data transfers from the main storage to the extended storage or vice versa can be set to a free extent without limiting to a one page unit. It is further to be noted that a main storage address and an extended storage address are not necessarily located on the page boundary so that the extended storage may be used for other purposes as well as for paging processes.

What is claimed is:

1. A data processing system having an instruction processor, a storage controller, a main storage, and an extended storage, said storage controller comprising:

a data transfer unit for transferring data from the main storage to the extended storage or from the extended storage to the main storage in response to a transfer instruction from the instruction processor specifying an amount of data to be transferred; and means for sending to data transfer controlling means a main storage real address translated from a main storage virtual address specified by said transfer instruction, a number representing the number of bytes to be transferred from the main storage, an extended storage real address, and a number representing the number of bytes to be transferred from the extended storage, said sending being performed in units of data, each in a manner so as to match unit of data corresponding to a unit of the extended storage;

wherein said data transfer controlling means includes:

means for dividing data to be transferred from the main storage to the extended storage into page units based on the amount of said data to be transferred and said main storage virtual address specified by said transfer instruction, each page unit representing a unit of data which can be transferred by one operation between the main storage and the extended storage, means for, when a page unit to be transferred crosses a page boundary in the main storage, dividing the page unit into two blocks, converting a beginning address of the two blocks into a main storage real address and transmitting said two main storage real addresses, the number representing bytes of each of the blocks to be transferred, the extended storage real address and the number representing bytes of the extended storage to be transferred to the storage controller, means for, when a page unit to be transferred does not cross a page boundary, converting a beginning address of the page unit to a main storage real address and transmitting the main storage real address, the number of bytes of the page unit to be transferred, the extended storage real address and the number representing bytes of the extended storage to be transferred, to the storage controller, and means for transferring the data one page at a time between the main storage and the extended storage based on the main storage real address, the number representing bytes of each block to be transferred, the extended storage real address and the number representing bytes of the extended storage to be transferred.

2. A data processing system as claimed in claim 1, wherein the data transfer unit comprises a data buffer and an address addition-subtraction circuit for using the main storage real address as a source address and the extended storage real address as a destination address.

3. A data processing system as claimed in claim 1, wherein the data transfer unit comprises:
- a group of registers for holding a source address, a destination address, and the number of data to be transferred;
- a data buffer for temporarily storing the data to be transferred;
- an address addition-subtraction circuit for using the main storage real address and the extended storage real address as a source address and a destination address respectively; and
- an addition-subtraction circuit for operating on the number of data to be transferred;

wherein data is transferred by said data transfer controlling means.

4. A data processing system as claimed in claim 1, wherein said storage controller further comprises:
- means for translating the main storage virtual address into a main storage real address; and
- means for fetching from the main storage each page unit and storing said each page unit into the extended storage by use of the main storage real address and an extended storage real address.

5. A data processing system having an instruction processor, a storage controller, a main storage and an extended storage, said storage controller comprising:
- a data buffer for transferring data between the main storage and the extended storage; and
- data transfer controller means for controlling data transferred between the main storage and the extended storage based on a transfer instruction specifying an amount of data to be transferred between the main storage and the extended storage;

wherein said data transfer controlling means includes:
- means for dividing data to be transferred from the main storage to the extended storage into page units based on the amount of said data to be transferred and a main storage virtual address specified by said transfer instruction, each page unit representing a unit of data which can be transferred by one operation between the main storage and the extended storage,
- means for, when a page unit to be transferred crosses a page boundary in the main storage, dividing the page unit into two blocks, converting a beginning address of the two blocks into a main storage real address and transmitting said two main storage real addresses, a number representing bytes of each of the blocks to be transferred, an extended storage real address and a number representing bytes of the extended storage to be transferred to the storage controller,
- means for, when a page unit to be transferred does not cross a page boundary, converting a beginning address of the page unit to a main storage real address and transmitting the main storage real address, a number of bytes of the page unit to be transferred, an extended storage real address and a number representing bytes of the extended storage to be transferred, to the storage controller, and
- means for transferring the data one page at a time between the main storage and the extended storage based on the main storage real address, the number representing bytes of each block to be transferred, the extended storage real address and a number representing bytes of the extended storage to be transferred.

* * * * *